US012661790B2

(12) United States Patent
Naramura

(10) Patent No.: US 12,661,790 B2
(45) Date of Patent: Jun. 23, 2026

(54) REMOTE OPERATION METHOD, STORAGE MEDIUM, REMOTE OPERATION DEVICE, AND REMOTE OPERATION SYSTEM

(71) Applicant: HONDA MOTOR CO., LTD., Tokyo (JP)

(72) Inventor: Itoshi Naramura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 18/368,578

(22) Filed: Sep. 15, 2023

(65) Prior Publication Data

US 2024/0091941 A1 Mar. 21, 2024

(30) Foreign Application Priority Data

Sep. 20, 2022 (JP) ................................. 2022-149426

(51) Int. Cl.
*B25J 9/16* (2006.01)
*B25J 19/02* (2006.01)

(52) U.S. Cl.
CPC ............. *B25J 9/1671* (2013.01); *B25J 9/163* (2013.01); *B25J 9/1689* (2013.01); *B25J 19/023* (2013.01)

(58) Field of Classification Search
CPC ........ B25J 9/1671; B25J 9/163; B25J 9/1689; B25J 19/023
See application file for complete search history.

(56) References Cited

U.S. PATENT DOCUMENTS

2016/0207198 A1* 7/2016 Willför .................. B25J 9/1676
2020/0078948 A1* 3/2020 Krause .................. G06F 3/0346

2021/0241723 A1* 8/2021 Tucker ................. G02B 27/017
2022/0096197 A1* 3/2022 Song ........................ G06T 17/20
2022/0300738 A1* 9/2022 Hu ........................... G06V 20/64
2022/0331972 A1* 10/2022 Hama .................... B25J 9/1671
2024/0208047 A1* 6/2024 Itou ...................... G06V 10/987

FOREIGN PATENT DOCUMENTS

JP 2022/026692 2/2022
WO 2019/046559 3/2019
WO 2022/026692 2/2022

OTHER PUBLICATIONS

Ben Mildenhall et al., NeRF: Representing Scenes as Neural Radiance Fields for View Synthesis, ECCV 2020 (oral), 2020.
Japanese Office Action for Japanese Patent Application No. 2022-149426 mailed Sep. 2, 2025.

* cited by examiner

*Primary Examiner* — Mohamad O El Sayah
(74) *Attorney, Agent, or Firm* — Amin, Turocy & Watson, LLP

(57) ABSTRACT

A remote operation method of a robot includes: a conversion step of converting an operation input to a joint angle command value of the robot when an operator performs an operation; an acquisition step of acquiring actual visual information of a space in which the robot is present; a generation step of generating virtual visual information of an arbitrary viewpoint in the space in which the robot is present for the operator using a three-dimensional representation; and a projection step of projecting the virtual visual information to a screen viewed by the operator when the actual visual information is not newly acquired and projecting a mixed image in which an image based on the newly acquired actual visual information is combined with the virtual visual information when the actual visual information is newly acquired.

9 Claims, 12 Drawing Sheets

REMOTE OPERATION METHOD, STORAGE MEDIUM, REMOTE OPERATION DEVICE, AND REMOTE OPERATION SYSTEM

CROSS-REFERENCE TO RELATED APPLICATION

Priority is claimed on Japanese Patent Application No. 2022-149426, filed Sep. 20, 2022, the content of which is incorporated herein by reference.

BACKGROUND OF THE INVENTION

Field of the Invention

The present invention relates to a remote operation method, a storage medium, a remote operation device, and a remote operation system.

Description of Related Art

When a remote operation of a robot is performed, an operator needs to ascertain a surrounding environment of the robot placed in a remote location. Since a sense of vision out of the five senses of a human being occupies most of perception, it is significant to present visual information for ascertaining an environment. A system that combines and provides image data in a remote location has been proposed (for example, see Patent Document 1).

[Patent Document 1] PCT International Publication No. 2022/026692

SUMMARY OF THE INVENTION

However, since a data volume of visual information is large and a communication band is limited at the time of remote operation, a communication delay occurs. For example, a delay of about 0.75 seconds in a round trip occurs between an international space station and the earth, and a delay of about 3 seconds in a round trip occurs between the moon and the earth. This delay time is likely to change depending on conditions of a transmission path. Operability is damaged in an environment in which a communication delay changes. In this way, in the related art, operability is damaged due to transmission delay of image information at the time of remote operation.

An aspect of the present invention was invented in consideration of the aforementioned problems, and an objective thereof is to provide a remote operation method, a storage medium, a remote operation device, and a remote operation system that can provide image information without damaging operability even in an environment in which a delay occurs.

In order to solve the aforementioned problems and to achieve the aforementioned objective, the present invention employs the following aspects.

(1) According to an aspect of the present invention, there is provided a remote operation method of a robot including: a conversion step of converting an operation input to a joint angle command value of the robot when an operator performs an operation; an acquisition step of acquiring actual visual information of a space in which the robot is present; a generation step of generating virtual visual information of an arbitrary viewpoint in the space in which the robot is present for the operator using a three-dimensional representation; and a projection step of projecting the virtual visual information to a screen viewed by the operator when the actual visual information is not newly acquired and projecting a mixed image in which an image based on the newly acquired actual visual information is combined with the virtual visual information when the actual visual information is newly acquired.

(2) In the aspect of (1), the virtual visual information may be calculated through inverse conversion of the three-dimensional representation for predicting parameters such as a motion and a shape from the visual information by regression with visual information stored at the time of acquisition of the actual visual information and visual information stored in a time at which the actual visual information arrives at the operator as inputs and calculated by interpolating the parameters between times using a time-series network.

(3) In the aspect of (1) or (2), the generation step may include generating the virtual visual information by inputting the joint angle command value, a posture of the screen viewed by the operator, and the acquired actual visual information to a trained model.

(4) In the aspect of one of (1) to (3), the virtual visual information may be generated using posture information obtained by estimating postures of the robot and an object to be operated at a time at which the actual visual information is acquired.

(5) In the aspect of one of (1) to (4), the actual visual information may include meta data including time information indicating a time at which an image is captured, position information of an object to be operated recognized through a recognition process performed on the captured image, and posture information of the object to be operated, and the generation step may include generating the virtual visual information using estimation information obtained by estimating the posture of the robot and the posture of the object to be operated using the meta data.

(6) In the aspect of one of (1) to (5), the projection step may include determining a mixture ratio of the actual visual information and the virtual visual information according to a rate of change of the actual visual information with time.

(7) In the aspect of one of (1) to (6), the actual visual information may include RGB data and depth data.

(8) According to another aspect of the present invention, there is provided a non-transitory computer-readable storage medium storing a program, the program causing a remote operation computer to perform: converting an operation input to a joint angle command value of the robot when an operator performs an operation; acquiring actual visual information of a space in which the robot is present; generating virtual visual information of an arbitrary viewpoint in the space in which the robot is present for the operator using a three-dimensional representation; and projecting the virtual visual information to a screen viewed by the operator when the actual visual information is not newly acquired and projecting a mixed image in which an image based on the newly acquired actual visual information is combined with the virtual visual information when the actual visual information is newly acquired.

(9) According to another aspect of the present invention, there is provided a remote operation device including: a conversion unit configured to convert an operation input to a joint angle command value of the robot when an operator performs an operation; an acquisition unit configured to acquire actual visual information of a space in which the robot is present; a generation unit configured to generate virtual visual information of an arbitrary viewpoint in the space in which the robot is present for the operator using a three-dimensional representation; and a projection unit configured to project the virtual visual information to a screen viewed by the operator when the actual visual information is not newly acquired and to project a mixed image in which an image based on the newly acquired actual visual information is combined with the virtual visual information when the actual visual information is newly acquired.

(10) According to another aspect of the present invention, there is provided a remote operation system including a remote operation device and a remote-location device, wherein the remote-location device includes a robot and a visual sensor detecting an actual visual image of an environment in which the robot is present, and the remote operation device includes: a conversion unit configured to convert an operation input to a joint angle command value of the robot when an operator performs an operation; an acquisition unit configured to acquire actual visual information of a space in which the robot is present; a generation unit configured to generate virtual visual information of an arbitrary viewpoint in the space in which the robot is present for the operator using a three-dimensional representation; and a projection unit configured to project the virtual visual information to a screen viewed by the operator when the actual visual information is not newly acquired and to project a mixed image in which an image based on the newly acquired actual visual information is combined with the virtual visual information when the actual visual information is newly acquired.

According to the aspects of (1) to (10), it is possible to provide image information without damaging operability even in an environment in which a delay occurs.

DETAILED DESCRIPTION OF THE INVENTION

Figure 1:
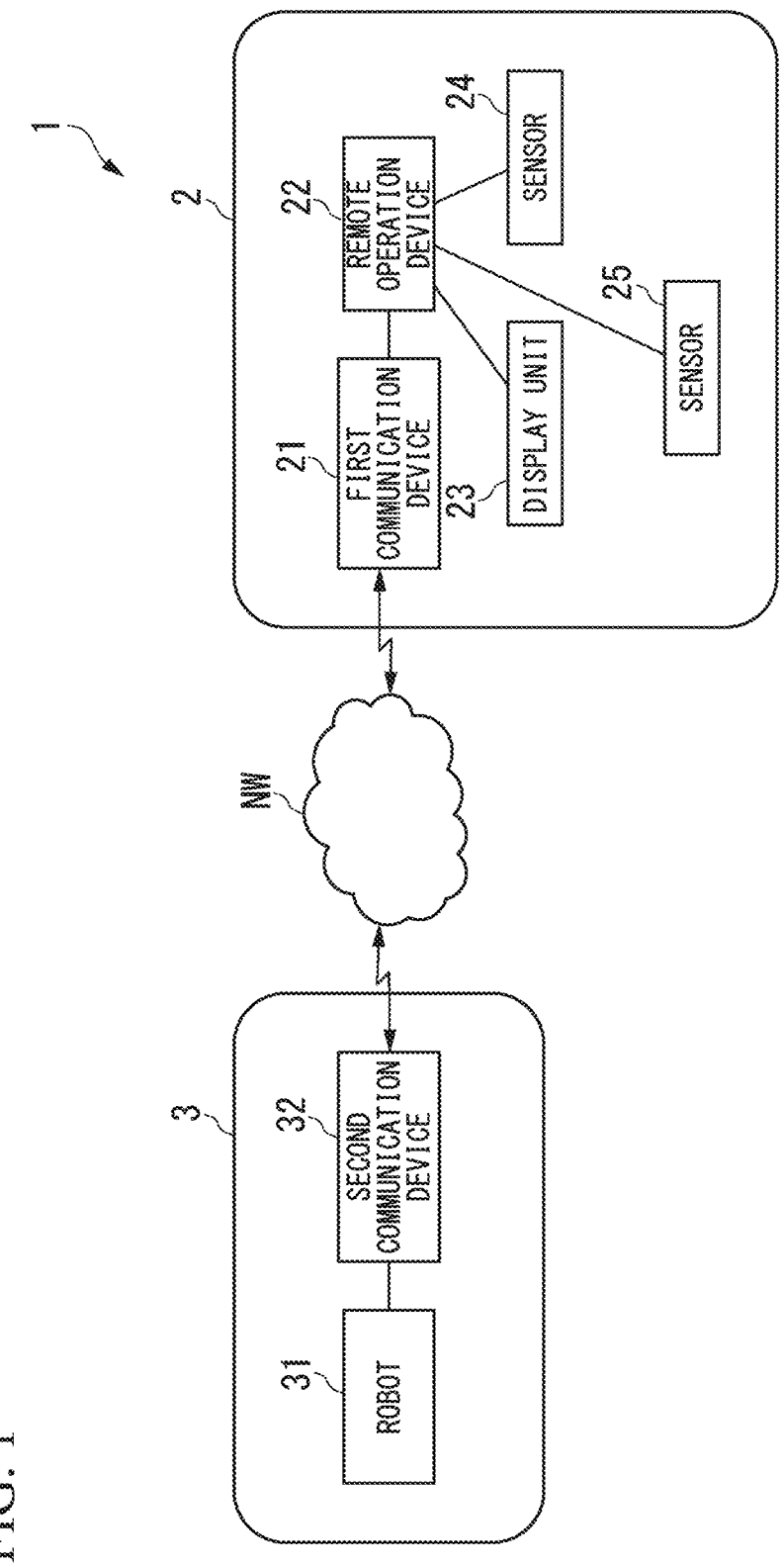
FIG. 1 is a diagram illustrating an example of a configuration of a remote operation system according to an embodiment.

Hereinafter, an embodiment of the present invention will be described with reference to the accompanying drawings. In the drawings referred to in the following description, scales of constituent members are appropriately changed in order to draw the constituent members in recognizable sizes.

In the drawings used to describe an embodiment, elements having the same functions will be referred to by the same reference signs and repeated description thereof will be omitted.

"On the basis of XX" mentioned in this specification means "on the basis of at least XX" and includes "on the basis of another element in addition to XX." "On the basis of XX" is not limited to direct use of XX and includes use of results obtained by performing calculation or processing on XX. "XX" is an arbitrary factor (for example, arbitrary information).

[Configuration Example of Remote Operation System]

FIG. 1 is a diagram illustrating an example of a configuration of a remote operation system according to an embodiment. As illustrated in FIG. 1, the remote operation system 1 includes an operation-side device 2 and a remote-location device 3.

The operation-side device 2 includes, for example, a first communication device 21, a remote operation device 22, a display unit 23, a sensor 24, and a sensor 25.

The remote-location device 3 includes, for example, a robot 31 and a second communication device 32.

The operation-side device 2 (a remote operation device) and the remote-location device 3 are connected to each other via a network NW.

The first communication device 21 receives information transmitted from the remote-location device 3 and outputs the received reception information to the remote operation device 22. The first communication device 21 transmits transmission information output from the remote operation device 22 to the remote-location device 3.

The remote operation device 22 generates an image which is displayed on the display unit 23 on the basis of the reception information and displays the generated image on the display unit 23. The remote operation device 22 generates a control command for the robot 31 on the basis of a result detected by a sightline detecting unit provided in the display unit 23, an angle or a motion of hands or fingers of an operator detected by the sensor 24, an angle of a joint or the like of the robot 31 included in the reception information, and environment information included in the reception information. The remote operation device 22 outputs the generated control command as transmission information to the first communication device 21. The remote operation device 22 estimates a posture of a head of the operator on the basis of a detection result from the sensor 25.

The display unit 23 is, for example, a head-mounted display (HMD) and includes a sight line detecting unit configured to detect an operator's sightline. The display unit 23 displays an image generated by the remote operation device 22.

The sensor 24 is an operation instruction detecting unit that is worn on an operator's hand. The sensor 24 detects a position, an angle, a motion, and the like of the operator's hand or finger.

The sensor 25 detects a viewpoint and a sightline direction of the operator.

The robot 31 includes at least a manipulator, a visual sensor (a camera), and a sensor detecting an angle, a position, or a motion of the manipulator. The robot 31 outputs an image captured by the visual sensor and a detection result from the sensor to the second communication device 32. The robot 31 operates in accordance with a control instruction included in transmission information output from the second communication device 32.

The second communication device 32 receives transmission information transmitted from the operation-side device 2 and outputs a control instruction included in the transmission information to the robot 31. The second communication device 32 transmits an image and a detection result output from the robot 31 to the operation-side device 2.

[Configuration Example of Remote-Location Device]

Figure 2:
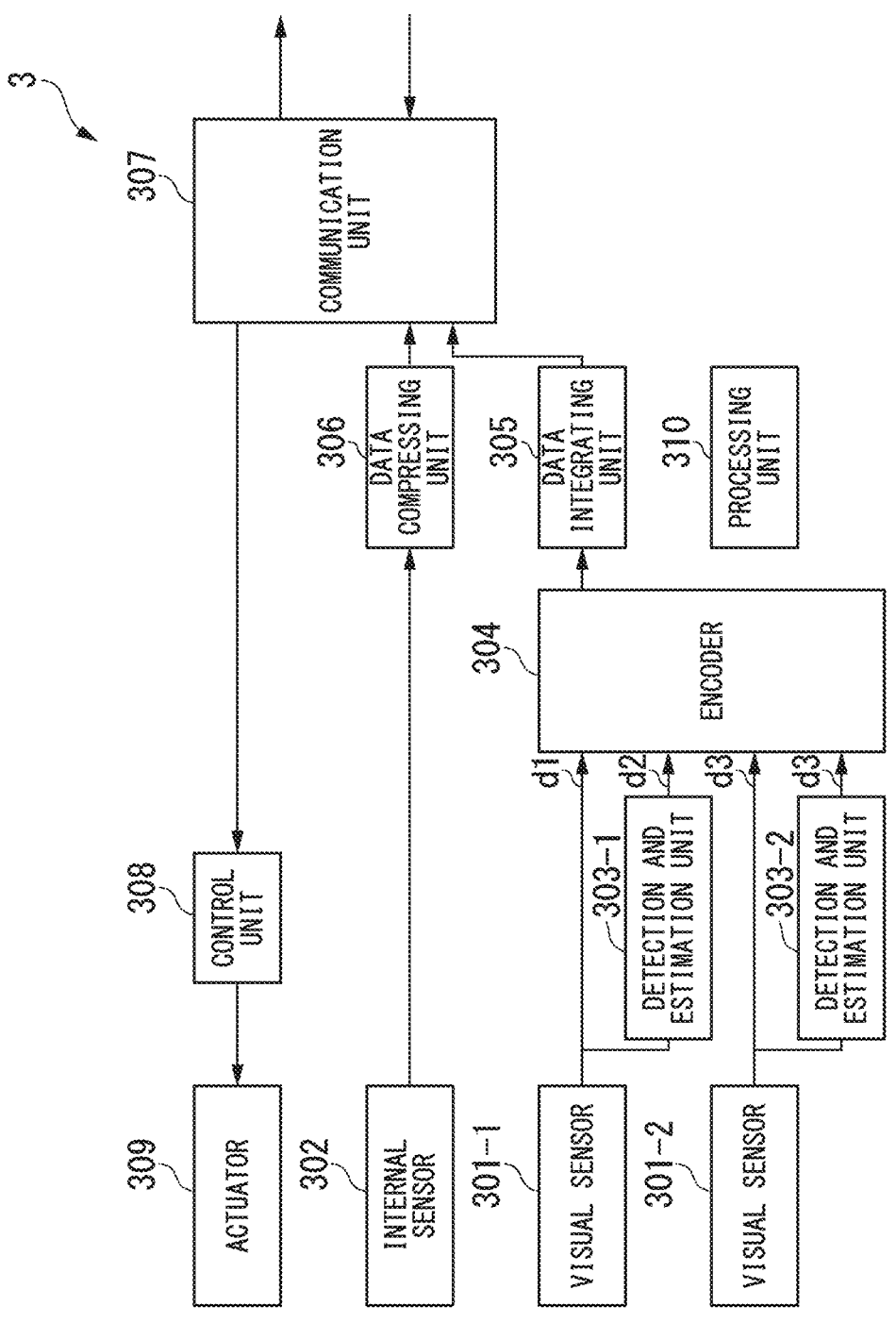
FIG. 2 is a diagram illustrating an example of a configuration of a remote-location device according to the embodiment.

FIG. 2 is a diagram illustrating an example of a configuration of the remote-location device according to the embodiment. As illustrated in FIG. 2, the remote-location device 3 includes, for example, a visual sensor 301 (301-1, 301-2), an internal sensor 302, a detection and estimation unit 303 (303-1, 303-2), an encoder 304, a data integrating unit 305, a data compressing unit 306, a communication unit 307, a control unit 308, an actuator 309, and a processing unit 310. The configuration example illustrated in FIG. 2 is a configuration example for presenting a stereo image to the operation-side device 2.

The visual sensor 301 (301-1, 301-2) is, for example, an imaging device including a fish-eye lens. The visual sensor 301 is attached to, for example, the head of the robot 31. An image captured by the visual sensor 301 includes depth information. The number of visual sensors 301 may be one or three or more.

The internal sensor 302 is a sensor that is attached to a joint of an end effector or the like provided in the robot 31 and is, for example, a joint encoder, a tension sensor, or a torque sensor.

The detection and estimation unit 303 (303-1, 303-2) separates a region of interest (ROI) and a background by performing a known instance segmentation process on the imaged RGBD data. When a plurality of objects appear in a captured image, object recognition is performed on each object. The detection and estimation unit 303 performs known image processing on the imaged RGBD data and estimates a posture of an object. The detection and estimation unit 303 (303-1, 303-2) is meta data including a time stamp, a posture, an instance (a region of interest ROT and class information (ID)).

The encoder 304 encodes the RGBD (W(width)×H (height)×4(four of RGBD)) data output from the visual sensor 301-1, the meta data output from the detection and estimation unit 303-1, the RGBD (W×H×4) data output from the visual sensor 301-2, and the meta data output from the detection and estimation unit 303-2 into data which can be streamed using a predetermined method.

The data integrating unit 305 integrates the encoded data.

The data compressing unit 306 compresses a detection result from the internal sensor 302 using a predetermined method.

The communication unit 307 transmits the integrated data output from the data integrating unit 305 and the detection result compressed by the data compressing unit 306 to the operation-side device 2 via the network NW. The communication unit 307 receives the transmission information including a control instruction from the operation-side device 2 and outputs the received control instruction to the control unit 308. Image data which is transmitted is data obtained by decreasing a frame rate or decreasing a resolution of a capture image according to a communication environment. The communication unit 307 includes a first communication unit configured to transmit the integrated data and a second communication unit configured to transmit the compressed data.

The control unit 308 drives the actuator 309 using the control instruction.

The actuator 309 is attached to an end effector. The actuator 309 is driven under the control of the control unit 308.

The processing unit 310 controls acquisition of data from the visual sensor 301, acquisition of data from the internal sensor 302, data compression, data integration, and data transmission in the encoder 304, and the like.

[Configuration Example of Operation-Side Device]

Figure 3:
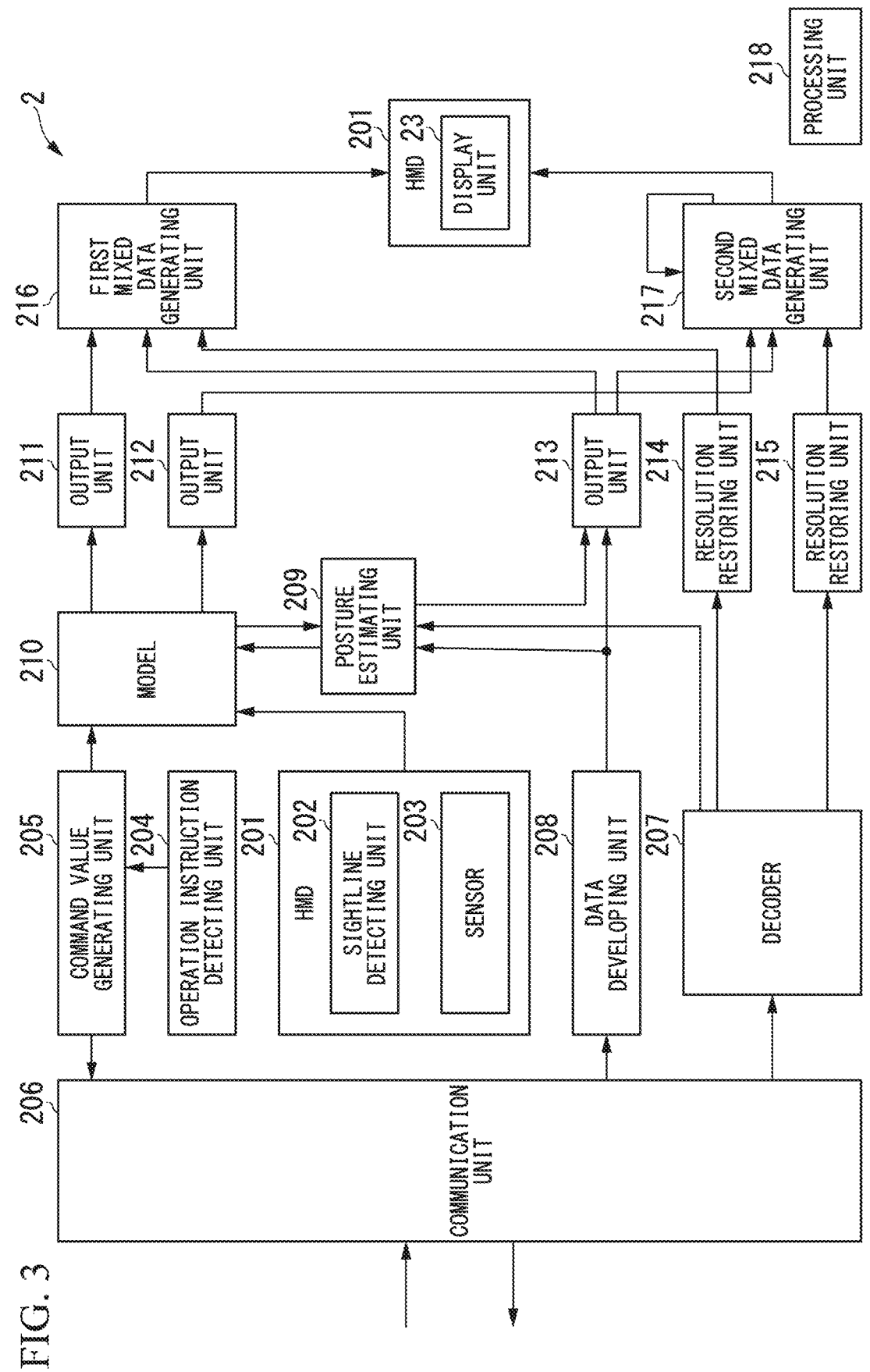
FIG. 3 is a diagram illustrating an example of a configuration of an operation-side device according to the embodiment.

FIG. 3 is a diagram illustrating an example of a configuration of the operation-side device according to the embodiment. As illustrated in FIG. 3, the operation-side device 2 includes, for example, an HMD 201 (a projection unit), an operation instruction detecting unit 204 (a sensor 24), a command value generating unit 205 (a conversion unit), a communication unit 206 (an acquisition unit), a decoder 207, a data developing unit 208, a posture estimating unit 209, a model 210 (a generation unit), an output unit 211, an output unit 212, an output unit 213, a resolution restoring unit 214, a resolution restoring unit 215, a first mixed data generating unit 216 (a generation unit, a projection unit), a second mixed data generating unit 217 (a generation unit, a projection unit), and a processing unit 218 (a generation unit, a projection unit).

The HMD 201 includes a sightline detecting unit 202 (a sensor 25), a sensor 203 (the sensor 25) detecting a position and a posture of the HMD 201, and a display unit 23 (FIG. 1).

The configuration example illustrated in FIG. 3 is a configuration example when the operation-side device 2 presents a stereo image.

The sightline detecting unit 202 (the sensor 25) detects a viewpoint and a sightline direction of an operator. The sightline detecting unit 202 is provided, for example, on the right and left sides to correspond to both eyes. The sightline detecting unit 202 inputs the detected right and left viewpoints and the detected sightline direction to the model 210.

The operation instruction detecting unit 204 (the sensor 24) detects a position, a motion, and the like of an operator's finger or hand. The operation instruction detecting unit 204 is an operation input interface in remote operation. The operation instruction detecting unit 204 outputs the detected detection result to the command value generating unit 205. The operation instruction detecting unit 204 is, for example, a data glove or an exoskeleton device.

The command value generating unit 205 generates a control command for a hand or an arm of the robot 31 using the detection result output from the operation instruction detecting unit 204 and outputs the generated control command to the communication unit 206. That is, when an operator performs an operation, the command value generating unit 205 converts the operation input to a joint angle command value for the robot 31. The command value generating unit 205 generates a joint angle for the hand or the arm of the robot 31 using the detection result output from the operation instruction detecting unit 204 and inputs information indicating the generated joint angle to the model 210.

The communication unit 206 transmits a control command output from the command value generating unit 205 to the remote-location device 3 via the network NW. The communication unit 206 outputs the integrated data included in the information received from the remote-location device 3 to the decoder 207. The communication unit 206 outputs the compressed data included in the information received from the remote-location device 3 to the data developing unit 208. The communication unit 206 includes a first communication unit configured to receive the integrated data and a second communication unit configured to receive the compressed data.

The decoder 207 performs a decoding process on the decoded integrated data using a predetermined method. The decoder 207 extracts RGBD data and meta data through this process. The decoder 207 outputs the meta data to the posture estimating unit 209. The decoder 207 outputs the RGBD data to the resolution restoring unit 214 and the resolution restoring unit 215.

The data developing unit 208 decompresses the compressed data and develops the decompressed data. The data developing unit 208 extracts the detection result from the internal sensor 302 through this process and outputs the detection result from the internal sensor 302 to the posture estimating unit 209 and the output unit 213.

The posture estimating unit 209 is a reasoner. The posture estimating unit 209 estimates a posture of an object to be operated and a posture of an end effector (an arm or a hand) of the robot 31 without a delay using a known method on the basis of the meta data input from the decoder 207, the detection result from the internal sensor 302 input from the data developing unit 208, and the virtual viewpoint (virtual visual) image data input from the model 210. Accordingly, the posture of the object to be operated and the posture of the end effector (the arm or the hand) of the robot 31 which are input from the posture estimating unit 209 to the model 210 are posture data estimated with a delay time as details. The posture estimating unit 209 estimates the postures on the basis of a time difference (a delay value) between a time at which the internal sensor 302 has acquired data and a time at which the operation-side device has acquired data using the time stamp included in the acquired data. The posture estimating unit 209 may store a preferable posture of the robot 31 in advance at the time at which the delay value has elapsed in operation on the basis of the command value generated by the command value generating unit 205 and estimate the posture with reference to the stored information.

The model 210 is, for example, a model having learned virtual viewpoint image data (RGBD data) of a working state using a viewpoint and a sightline direction of an operator, a joint angle of the operator, and a posture of an object and a posture of an end effector of the robot 31 estimated by the posture estimating unit 209. The model 210 is expressed, for example, by a neural radiance fields (NeRF) representation (a neural three-dimensional representation). The NeRF can generate a 3D model from images of a plurality of viewpoints and render an image of an arbitrary viewpoint. The NeRF can express a 3D model as a machine learning model without using a polygon (for example, see Reference Document 1). The model 210 outputs, for example, RGBD (W(width)×H(height)×4(four of RGBD))

data with a higher resolution than the resolution of the right and left captured image data to the output unit 211 and the output unit 212 on the basis of the input data.

Reference Document 1: Ben Mildenhall1, Pratul P. Srinivasan1, et al, "NeRF: Representing Scenes as Neural Radiance Fields for View Synthesis", ECCV 2020 (oral), 2020

The output unit 211 includes, for example, a decoder. The output unit 211 outputs the RGBD (W(width)×H(height)×4) data output from the model 210 to the first mixed data generating unit 216. The output unit 211 includes a buffer.

The output unit 212 includes, for example, a decoder. The output unit 212 outputs the RGBD (W(width)×H(height)×4) data output from the model 210 to the second mixed data generating unit 217. The output unit 212 includes a buffer.

The output unit 211 and the output unit 212 are also used to provide a stereoscopic view to the HMD 201. Accordingly, when a provided image is not a stereoscopic image, the operation-side device 2 has only to include one of the output unit 211 and the output unit 212.

The output unit 213 outputs the developed detection result from the internal sensor 302 to the first mixed data generating unit 216 and the second mixed data generating unit 217. The output unit 213 includes a buffer. The output unit 213 calculates a feature quantity by encoding the value estimated by the internal sensor 302.

The resolution restoring unit 214 restores the resolution of the decoded image data using a known method. The resolution restoring unit 214 outputs the RGBD (W(width)×H (height)×4(four of RGBD)) data which is restored image data with a super resolution to the first mixed data generating unit 216. The resolution restoring unit 214 includes a buffer.

The resolution restoring unit 215 restores the resolution of the decoded image data using a known method. The resolution restoring unit 215 outputs the RGBD (W(width)×H (height)×4(four of RGBD)) data which is restored image data with a super resolution to the second mixed data generating unit 217. The resolution restoring unit 215 includes a buffer.

The first mixed data generating unit 216 includes, for example, an encoder and a decoder. The first mixed data generating unit 216 generates mixed data of a virtual image and an actual image and displays the generated mixed data on the display unit 23 of the HMD 201. The virtual visual information is calculated through inverse conversion of the three-dimensional representation for predicting parameters such as a motion and a shape from the visual information by regression with visual information stored at the time of acquisition of the actual visual information detected by the visual sensor 301 and visual information stored in a time at which the actual visual information arrives at the operator as inputs and is calculated by interpolating the parameters between times using a time-series network. The first mixed data generating unit 216 may mix the virtual image and the actual image together using the feature quantity of the internal sensor 302 calculated by the output unit 213. In this embodiment, mixing means to provide actual visual information when the actual visual information is acquired and to provide virtual viewpoint information when actual visual information is not acquired as will be described later.

The second mixed data generating unit 217 includes, for example, an encoder and a decoder. The second mixed data generating unit 217 generates mixed data of a virtual image and an actual image and displays the generated mixed data on the display unit 23 of the HMD 201. The second mixed data generating unit 217 performs the mixing, for example, by determining a mixture ratio according to a rate of change. The second mixed data generating unit 217 may mix the virtual image and the actual image together using the feature quantity of the internal sensor 302 calculated by the output unit 213.

The operation-side device has only to include one of the first mixed data generating unit 216 and the second mixed data generating unit 217.

The first mixed data generating unit 216 and the second mixed data generating unit 217 are also used to provide a stereoscopic view to the HMD 201. Accordingly, when a provided image is not a stereoscopic image, the operation-side device 2 has only to include one of the first mixed data generating unit 216 and the second mixed data generating unit 217.

The processing unit 218 controls processing such as transmitting and receiving of data and setting of parameters.

The display unit 23 displays one of mixed data generated by the first mixed data generating unit 216 and mixed data generated by the second mixed data generating unit 217.

[Data Acquisition Timing, Reception Timing, and Estimation of Information]

Figure 4:
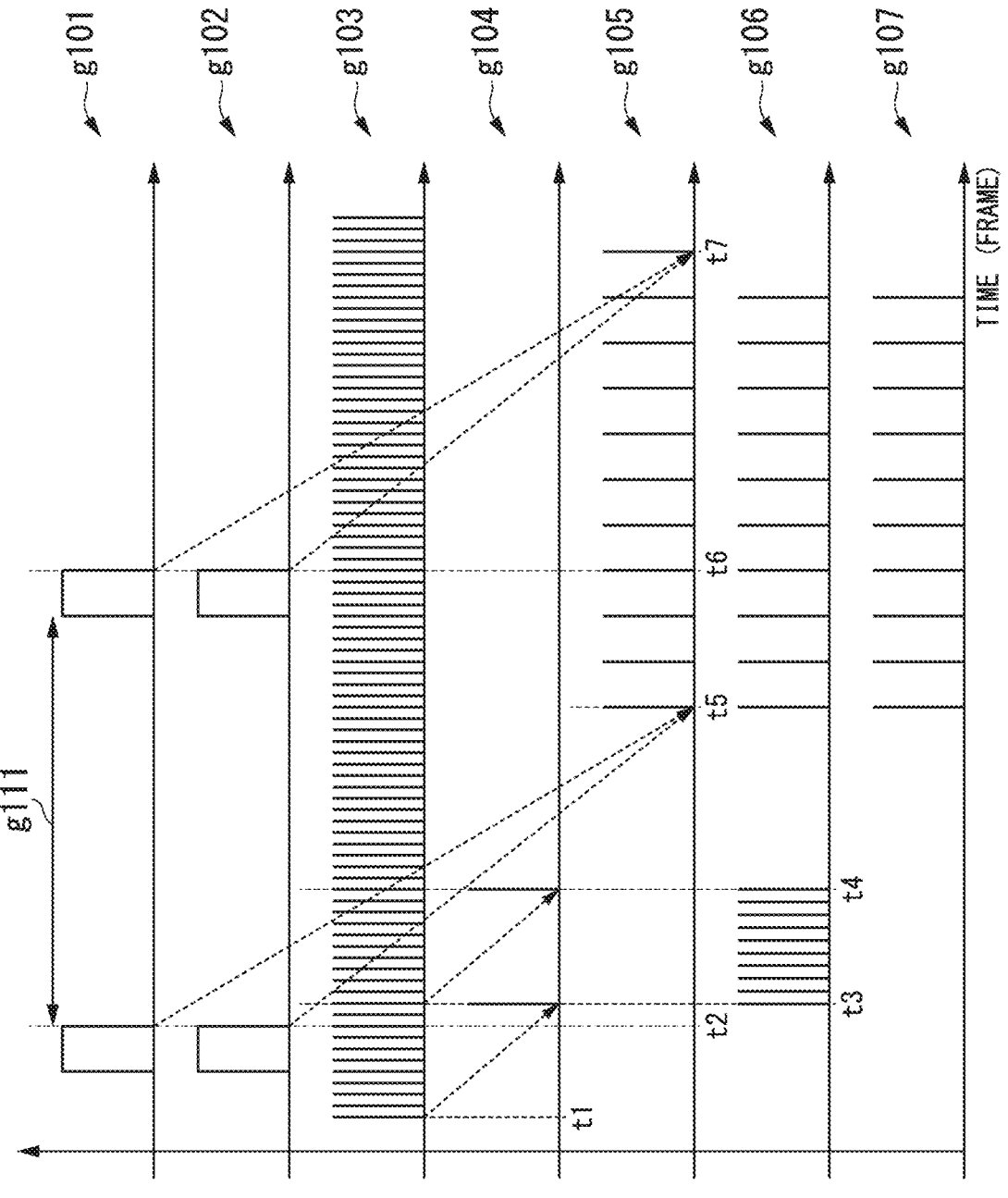
FIG. 4 is a diagram illustrating a data acquisition timing, a reception timing, extrapolation of estimated information, and the like according to the embodiment.

A data acquisition timing, a reception timing, and extrapolation of estimated information, and the like will be described below. FIG. 4 is a diagram illustrating a data acquisition timing, a reception timing, extrapolation of estimated information, and the like according to the embodiment. In FIG. 4, the horizontal axis represents a frame or time.

Reference sign g101 is an example of a data acquisition timing of the first visual sensor 301-1 (RGBD) (for example, left). Reference sign g102 is an example of a data acquisition timing of the second visual sensor 301-2 (RGBD) (for example, right). Since a communication band for transmission is often narrow, a frame rate (FPS) and a resolution can be increased as indicated by a two-way arrow g111. Accordingly, in this embodiment, since the operation-side device 2 performs a resolution restoring process, image data with a higher resolution than that of a captured image can be acquired. In this embodiment, data of the visual sensor 301 is transmitted and received by streaming.

Reference sign g103 indicates a data acquisition timing of the internal sensor 302 (such as a joint angle). For example, a consultative committee for space data systems (CCSDS) is used as a communication protocol in a universal space, and a packet in which an error has occurred is discarded. Accordingly, in a system in which a delay occurs in the unit of seconds, it is difficult to perform an interactive remote operation. Since monitoring can be interactively performed by mixing virtual images, a virtual images are mixed in this embodiment.

Reference signs g104 and g105 are timing examples at which previous information is received due to an influence of a communication delay.

In the example illustrated in FIG. 4, at time t1, the remote-location device 3 transmits data of the internal sensor 302. However, due to a delay in a communication system, the operation-side device 2 receives the transmitted data at time t3. Similarly, the data of the internal sensor 302 is transmitted at time t3, but the operation-side device 2 receives the transmitted data at time t5.

Data of the visual sensor 301 is transmitted at time t2, but the operation-side device 2 receives the transmitted data at time t5 due to a delay in the communication system. Data of the visual sensor 301 is transmitted at time t6, but the operation-side device 2 receives the transmitted data at time t7. The reason a delay time of transmission and reception for the visual sensor 301 is longer than a delay time of transmission and reception for the internal sensor 302 is that the data of the visual sensor 301 is image data and has a larger data volume than that of the data of the internal sensor 302.

For example, in the example indicated by reference sign g106, a signal received at time t4 is data in the past, for example, at time t3. Accordingly, in this embodiment, as indicated by reference sign g106, current information is estimated from the received past information, and information is extrapolated until information is received again. For example, the posture estimating unit 209 estimates data which is to be received at time t4 using the data received at time t3.

In case of image data, for example, image data received at time t6 is data transmitted at time t2 and current image data has not been acquired. Accordingly, in this embodiment, the model 210 estimates a current image and presents a mixed image of the estimated current image and image data estimated to be image data received by the first mixed data generating unit 216.

In this embodiment, as indicated by reference sign g107, a viewpoint image with a high resolution and a high frame rate is generated from a virtual image through the resolution restoring process. For example, during the time t6 to t7 in which actual image data is not received, such an image is continuously provided.

An arbitrary viewpoint image can be acquired without a delay because the HMD 201 is used by an operator. However, actual visual information of a space in which the robot 31 is present is delayed at the time of acquisition thereof. Accordingly, in this embodiment, a virtual viewpoint image at a current time without a delay is acquired by inputting the posture of the robot 31 estimated by the posture estimating unit 209 and the actual visual information acquired with a delay to the model 210. For example, since a joint angle of the robot 31 is estimated, a virtual viewpoint image at the current time without a delay which is a viewpoint image when viewed from the robot 31 is acquired. In this embodiment, since estimated information is used to perform such processing, it is possible to appropriately generate a virtual viewpoint image even when the timings at which information of the visual sensor 301 (an external sensor) and information of the internal sensor 302 have been acquired are different. When the posture estimating unit 209 estimates the posture of the robot 31, the processing unit 218 can acquire a command value based on the information acquired from the operation instruction detecting unit 204 without any delay and thus can also perform extrapolation, for example, using a Kalman filter in a period in which information of the internal sensor 302 is not acquired.

In this way, according to this embodiment, it is possible to provide a virtual viewpoint image without a delay even in a period in which data is not received.

[Processing Example of a Plurality of Viewpoints]

A configuration example when a plurality of viewpoints are processed will be described below.

Figure 5:
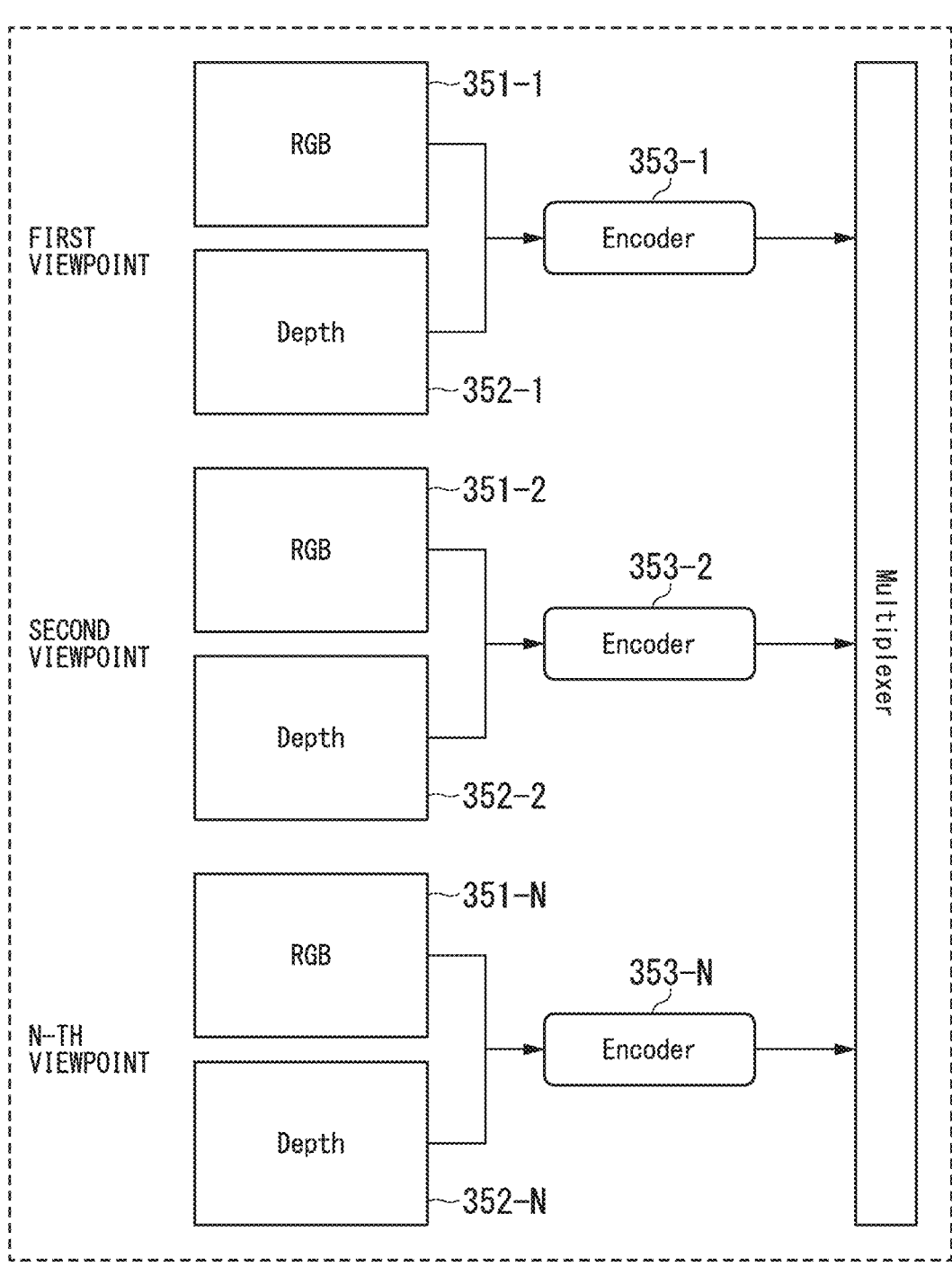
FIG. 5 is a diagram illustrating an example of a configuration for processing a plurality of viewpoints.

FIG. 5 is a diagram illustrating an example of a configuration when a plurality of viewpoints are processed. When a plurality of viewpoints are processed, for example, the HEVC standard of the Moving Picture Experts Group (MPEG) may be used for streaming signals. In this case, as illustrated in FIG. 5, for example, RGB image data 351-1 and depth data 352-1 associated with a first viewpoint are input to an encoder 353-1. RGB image data 351-N and depth data 352-N associated with an N-th viewpoint are input to an encoder 353-N. Outputs of the encoders 353-1 to 353-N are input to a mixer 354.

The aforementioned format and configuration are only examples and the present invention is not limited thereto.

The signal format may be another format, and the configuration has only to correspond to the signal format.

[Example of Routine in Remote Operation System]

Figure 6:
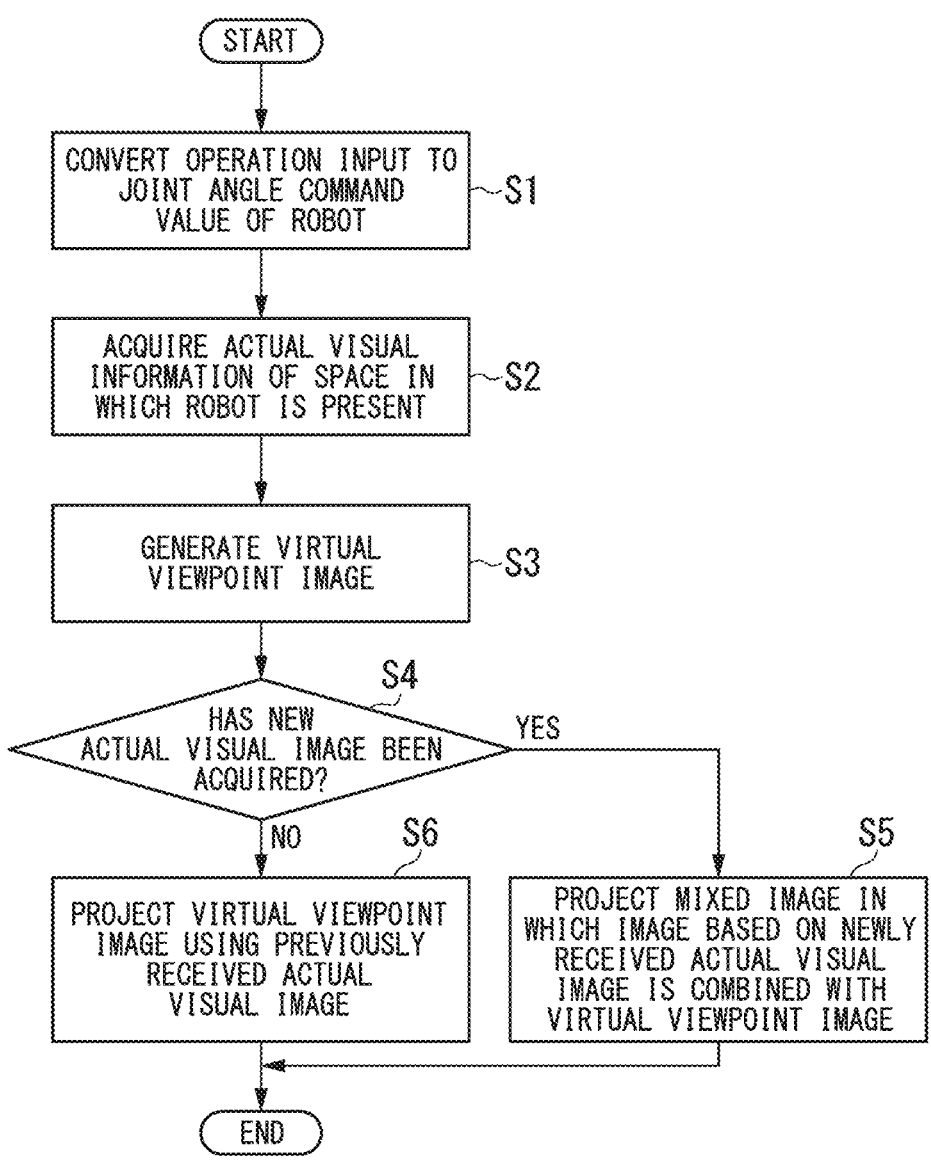
FIG. 6 is a flowchart illustrating a routine which is performed by the remote operation system according to the embodiment.

A routine which is performed by the remote operation system 1 will be described below. FIG. 6 is a flowchart illustrating an example of a routine which is performed by the remote operation system according to this embodiment.

(Step S1) When an operator performs an operation, the processing unit 218 of the operation-side device 2 converts an operation input to a joint angle command value of the robot 31.

(Step S2) The processing unit 218 acquires actual visual information of a space in which the robot 31 is present, which is detected by the visual sensor 301.

(Step S3) The processing unit 218 generates virtual visual information of an arbitrary viewpoint in the space in which the robot 31 is present for the operator using the model 210 using a neural three-dimensional representation.

(Step S4) The processing unit 218 determines whether new actual visual information has been acquired. When it is determined that new actual visual information has been acquired (a frame has been updated) (Step S4: YES), the processing unit 218 performs the process of Step S5. When it is determined that new actual visual information has not been acquired (a frame has not been updated) (Step S4: NO), the processing unit 218 performs the process of Step S6.

(Step S5) The processing unit 218 projects a mixed image in which an image based on the newly received actual visual information is combined with the virtual viewpoint image onto the HMD 201. Since the newly received actual visual information is delayed, the processing unit 218 combines an image newly received by predicting the delay with the image generated in Step S3. At this time, the processing unit 218 uses pixel values of pixels which do not change even in consideration of a delay or pixel values of an actual image for a new region. At this time, pixels of the actual image and the combined image are not projected without any change, but a combined image is prepared in consideration of a delay time and is projected. At that time, the processing unit 218 corrects extrapolated parameters such as a motion of an object on the basis of the actual image or the actual data. Thereafter, the processing unit 218 ends the routine.

(Step S6) The processing unit 218 projects the virtual viewpoint image generated in Step S3 to the HMD 201 using the past received actual visual information. Thereafter, the processing unit 218 ends the routine.

The processing unit 218 repeats the processes of Steps S1 to S6 while the operation is being performed.

[Example of Routine in Remote-Location Device]

An example of a routine which is performed by the remote-location device 3 will be described below.

Figure 7:
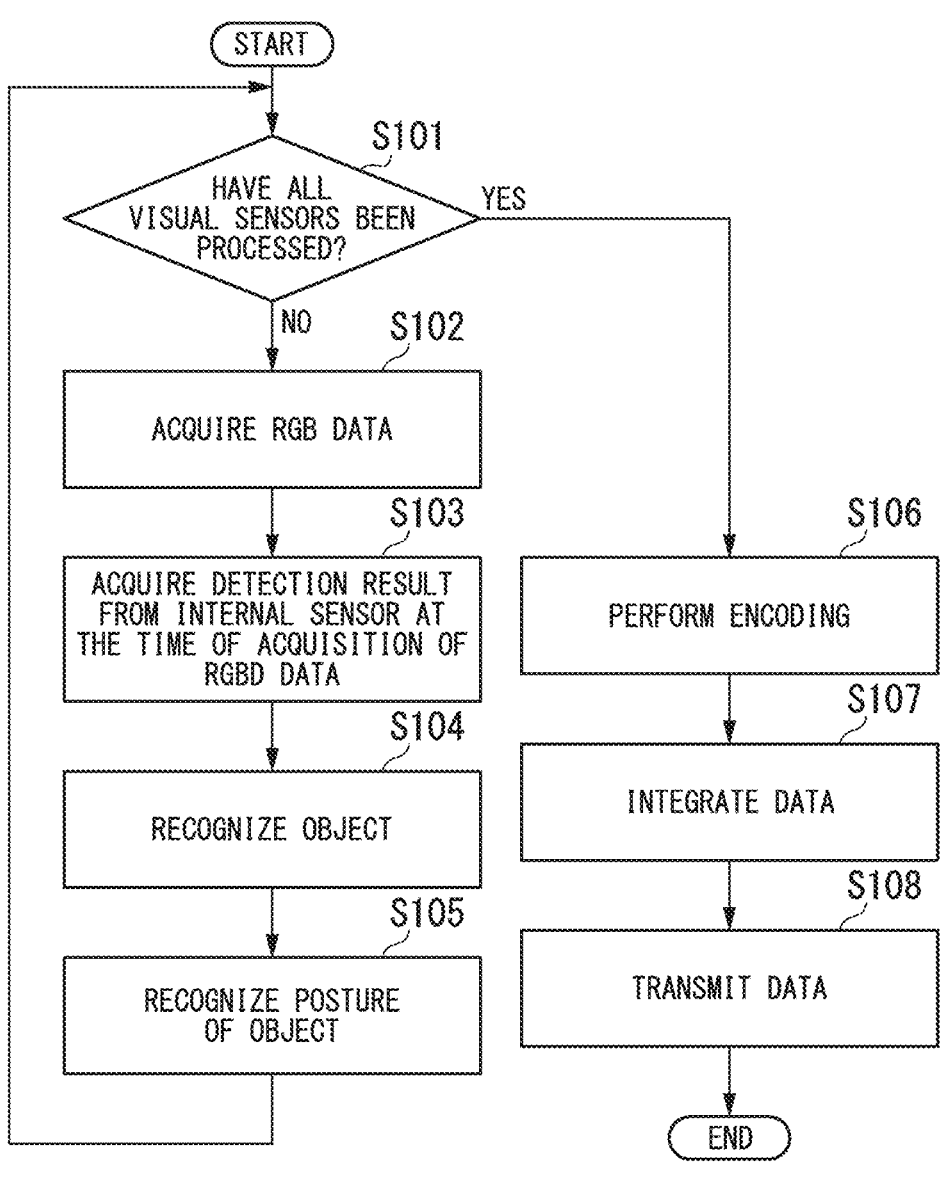
FIG. 7 is a flowchart illustrating a routine which is performed on detection data from a visual sensor by the remote-location device according to the embodiment.

First, an example of a routine which is performed by the visual sensor 301 will be described. FIG. 7 is a flowchart illustrating an example of a routine of processing detection data from the visual sensor of the remote-location device according to this embodiment.

(Step S101) The processing unit 310 determines whether all the visual sensors 301 have been processed (data has been acquired therefrom). When it is determined that all the visual sensors 301 have been processed (Step S101: YES), the processing unit 310 performs the process of Step S106. When it is determined that a visual sensor 301 not processed remains (Step S101: NO), the processing unit 310 performs the process of Step S102.

(Step S102) The processing unit 310 acquires RGBD data from the visual sensor 301.

(Step S103) The processing unit 310 acquires a detection result from the internal sensor 302 at the timing at which the RGBD data has been acquired.

(Step S104) The detection and estimation unit 303 recognizes an object using the acquired RGBD data.

(Step S105) The detection and estimation unit 303 recognizes a position and a posture of an object using the acquired RGBD data. Thereafter, the detection and estimation unit 303 returns the routine to Step S101.

(Step S106) The encoder 304 performs an encoding process on the RGBD data and the recognition result.

(Step S107) The data integrating unit 305 performs a data integrating process on the encoded data of a plurality of viewpoints. The data integrating process is performed on data of a plurality of viewpoints as performed by the mixer 354 in FIG. 5.

(Step S108) The communication unit 307 transmits the integrated data to the operation-side device 2.

Figure 8:
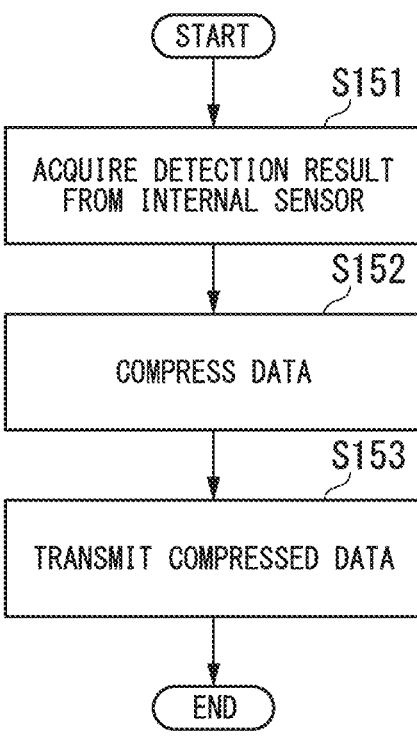
FIG. 8 is a flowchart illustrating a routine which is performed on a result of detection from an internal sensor of the remote-location device according to the embodiment.

An example of a routine for the internal sensor will be described below. FIG. 8 is a flowchart illustrating an example of a routine for processing the detection result from the internal sensor of the remote-location device according to this embodiment.

(Step S151) The processing unit 310 acquires a state of the robot 31 by acquiring a detection result from the internal sensor 302.

(Step S152) The data compressing unit 306 performs data compression on the detection result, for example, using an irreversible compression method.

(Step S153) The communication unit 307 transmits the compressed data to the operation-side device 2.

[Example of Routine in Operation-Side Device]

An example of a routine which is performed by the operation-side device 2 will be described below.

Figure 9:
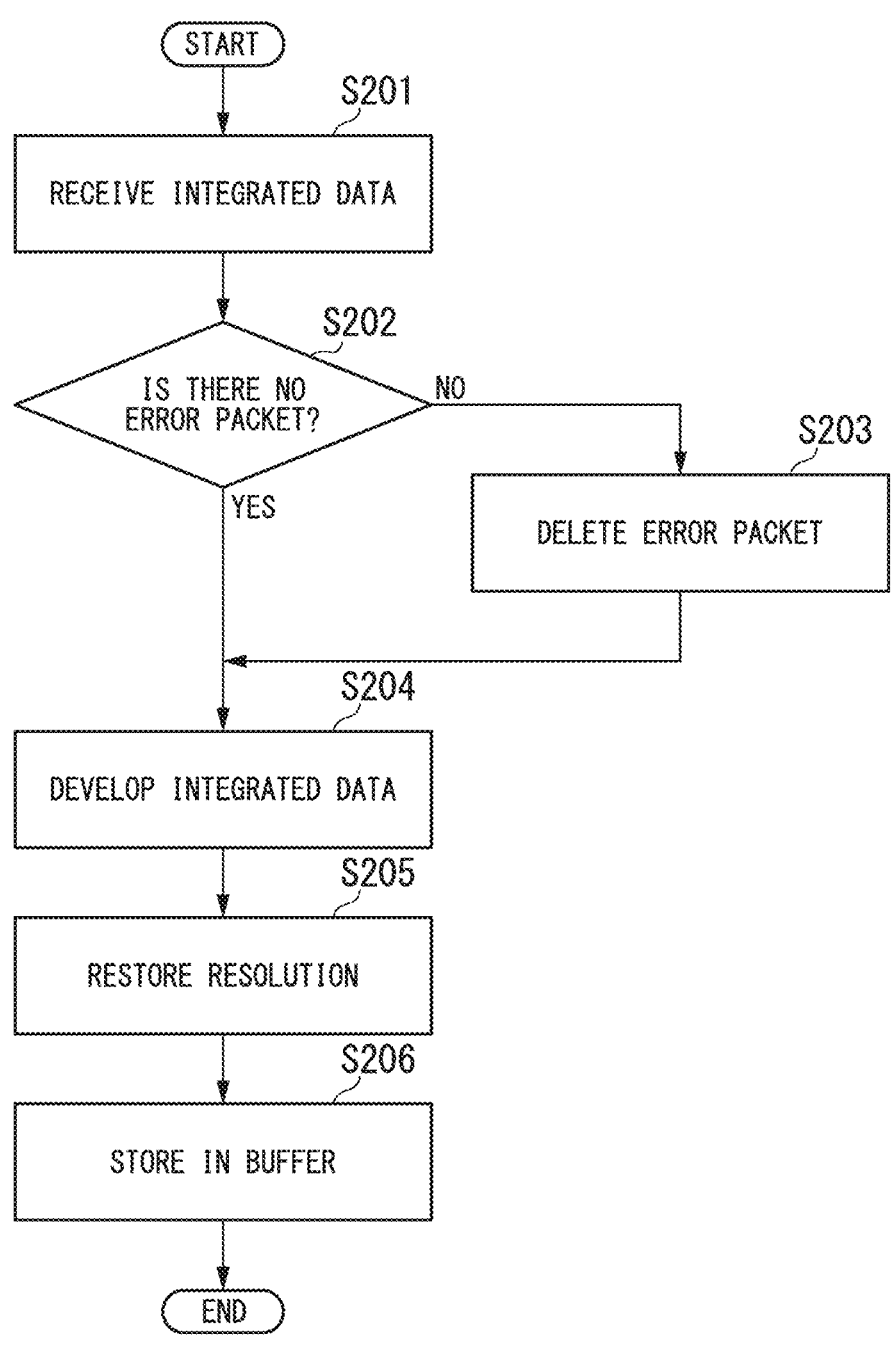
FIG. 9 is a flowchart illustrating a routine which is performed on integrated data from the remote-location device according to the embodiment.

First, an example of a routine which is performed on the integrated data will be described. FIG. 9 is a flowchart illustrating an example of a routine which is performed on the integrated data in the remote-location device according to this embodiment.

(Step S201) The communication unit 206 receives the integrated data transmitted from the remote-location device 3.

(Step S202) The communication unit 206 determines whether an error packet is included in the received data. When it is determined that an error packet is not included in the received data (Step S202: YES), the communication unit 206 performs the process of Step S204. When it is determined that an error packet is included in the received data (Step S202: NO), the communication unit 206 performs the process of Step S203.

(Step S203) The communication unit 206 deletes the error packet and performs the process of Step S204.

(Step S204) The decoder 207 decodes and develops the integrated data.

(Step S205) The resolution restoring units 214 and 215 perform a resolution restoring process on the RGBD data in the decoded data.

(Step S206) The resolution restoring units 214 and 215 store the data subjected to the resolution restoring process in the buffer.

Figure 10:
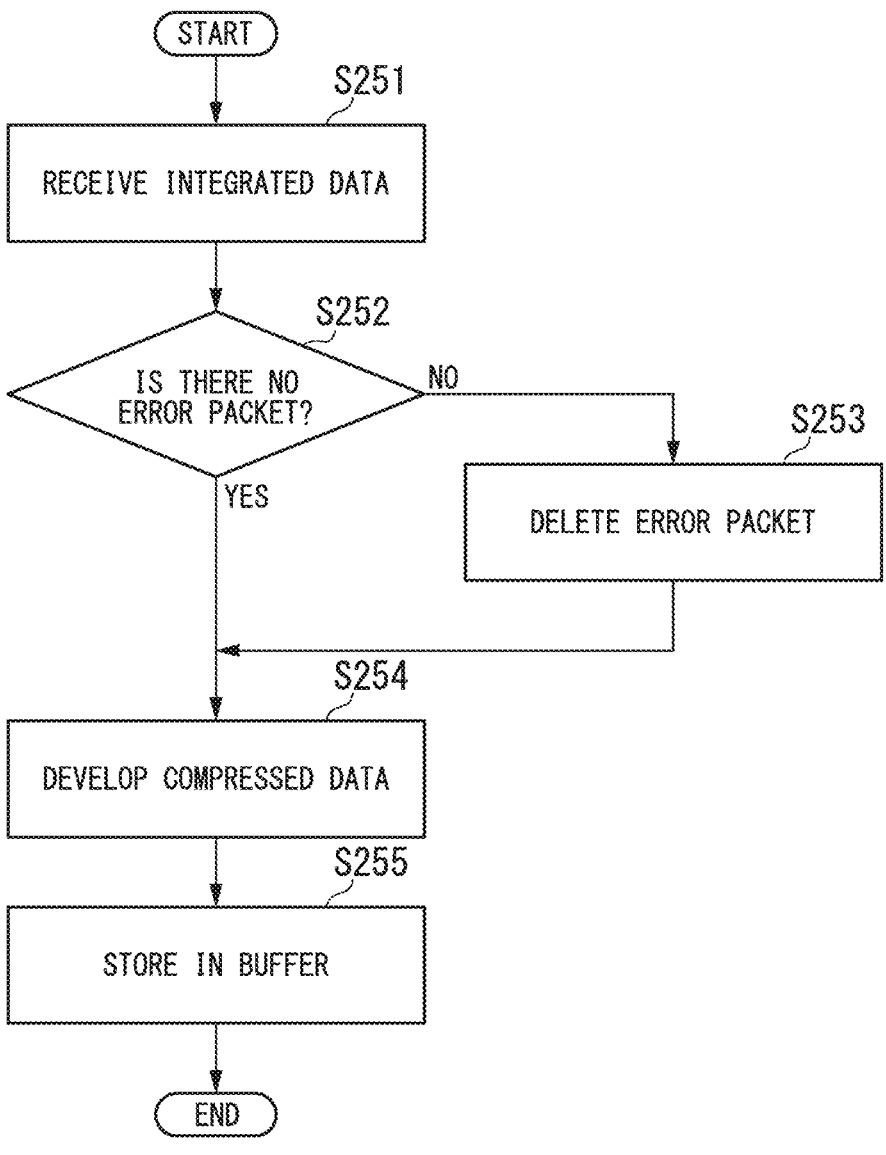
FIG. 10 is a flowchart illustrating a routine which is performed on compressed data from the remote-location device according to the embodiment.

An example of a routine which is performed on the compressed data will be described below. FIG. 10 is a flowchart illustrating an example of a routine which is performed on the compressed data in the remote-location device according to this embodiment.

(Step S251) The communication unit 206 receives the compressed data transmitted from the remote-location device 3.

(Step S252) The communication unit 206 determines whether an error packet is included in the received data. When it is determined that an error packet is not included in the received data (Step S252: YES), the communication unit 206 performs the process of Step S254. When it is determined that an error packet is included in the received data (Step S252: NO), the communication unit 206 performs the process of Step S253.

(Step S253) The communication unit 206 deletes the error packet and performs the process of Step S253.

(Step S254) The data developing unit 208 decompresses and develops the compressed data.

(Step S255) The output unit 213 stores the decompressed data in the buffer.

An example of processing routines such as generation of a virtual viewpoint image and mixing of images will be described below.

Figure 11:
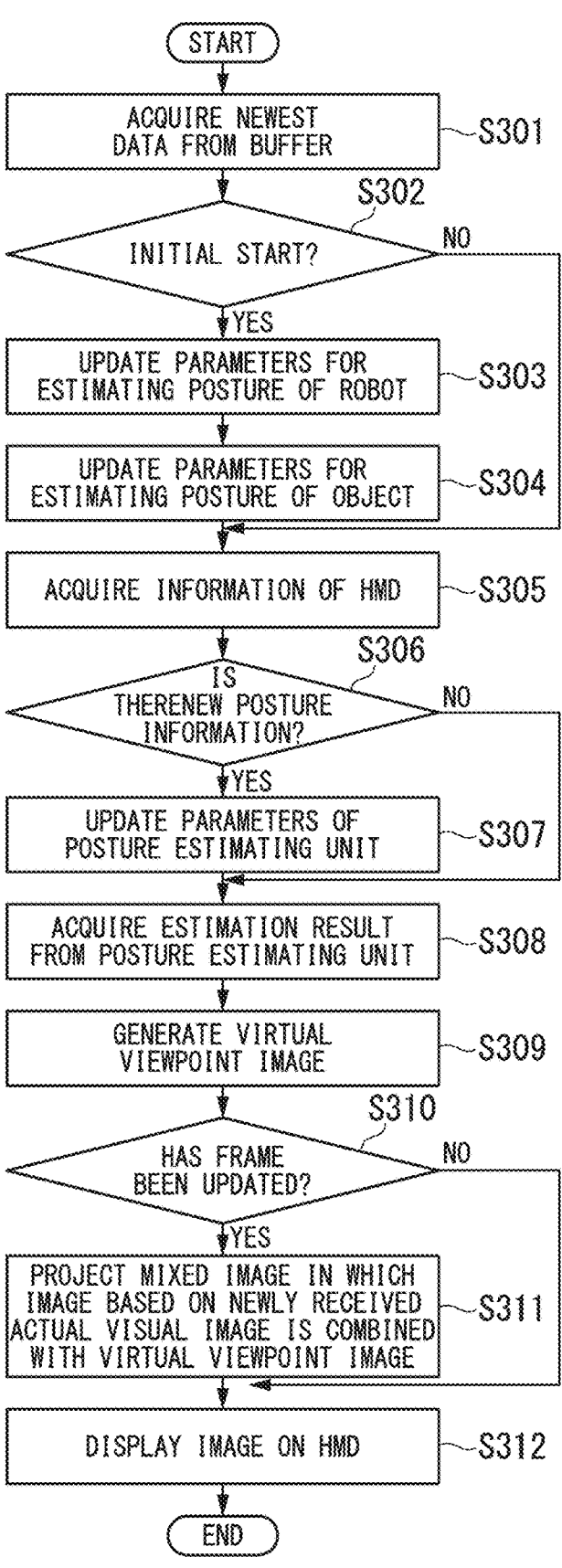
FIG. 11 is a flowchart illustrating a routine of generating a virtual viewpoint image, mixing images, and the like according to the embodiment.

FIG. 11 is a flowchart illustrating an example of processing routines such as generation of a virtual viewpoint image and mixing of images according to this embodiment.

(Step S301) The processing unit 218 acquires newest data from the buffer (Step S302) The processing unit 218 determines whether the operation-side device 2 has been started first (initial start). When it is determined that the operation-side device 2 has been started first (Step S302: YES), the processing unit 218 performs the process of Step S303. When it is determined that the operation-side device 2 has not been started first (Step S302: NO), the processing unit 218 performs the process of Step S305.

(Step S303) The processing unit 218 updates (initializes) parameters for estimating the posture of the robot 31 in the posture estimating unit 209.

(Step S304) The processing unit 218 updates (initializes) parameters for estimating a posture of an object in the posture estimating unit 209.

(Step S305) The processing unit 218 acquires information (a position and a posture) of the HMD 201.

(Step S306) The processing unit 218 determines whether there is new posture information of the robot 31 from the internal sensor 302. When it is determined that there is new posture information (Step S306: YES), the processing unit 218 performs the process of Step S307. When it is determined that there is no new posture information (Step S306: NO), the processing unit 218 performs the process of Step S308.

(Step S307) The processing unit 218 updates the parameters in the posture estimating unit 209.

(Step S308) The processing unit 218 acquires the estimation result (the posture of the robot 31 and the posture of the object) from the posture estimating unit 209.

(Step S309) The processing unit 218 generates a virtual viewpoint image by inputting the acquired data (the estimation result from the posture estimating unit, the position and posture of the HMD 201, and the detection result from the internal sensor 302) to the model 210.

(Step S310) The processing unit 218 determines whether a frame has been updated (whether an actual image has been acquired). When it is determined that a frame has been updated (Step S310: YES), the processing unit 218 performs the process of Step S311. When it is determined that a frame has not been updated (Step S310: NO), the processing unit 218 performs the process of Step S312.

(Step S311) At least one of the first mixed data generating unit 216 and the second mixed data generating unit 217 generates a mixed image in which an image based on newly received actual visual information is combined with a virtual viewpoint image.

(Step S312) At least one of the first mixed data generating unit 216 and the second mixed data generating unit 217 displays the virtual viewpoint image on the HMD 201 when an actual image has not been acquired and displays mixed data on the HMD 201 when an actual image has been acquired.

[Example of Image Displayed on HMD]

An example of an image which is displayed on the HMD 201 will be described below.

Figure 12:
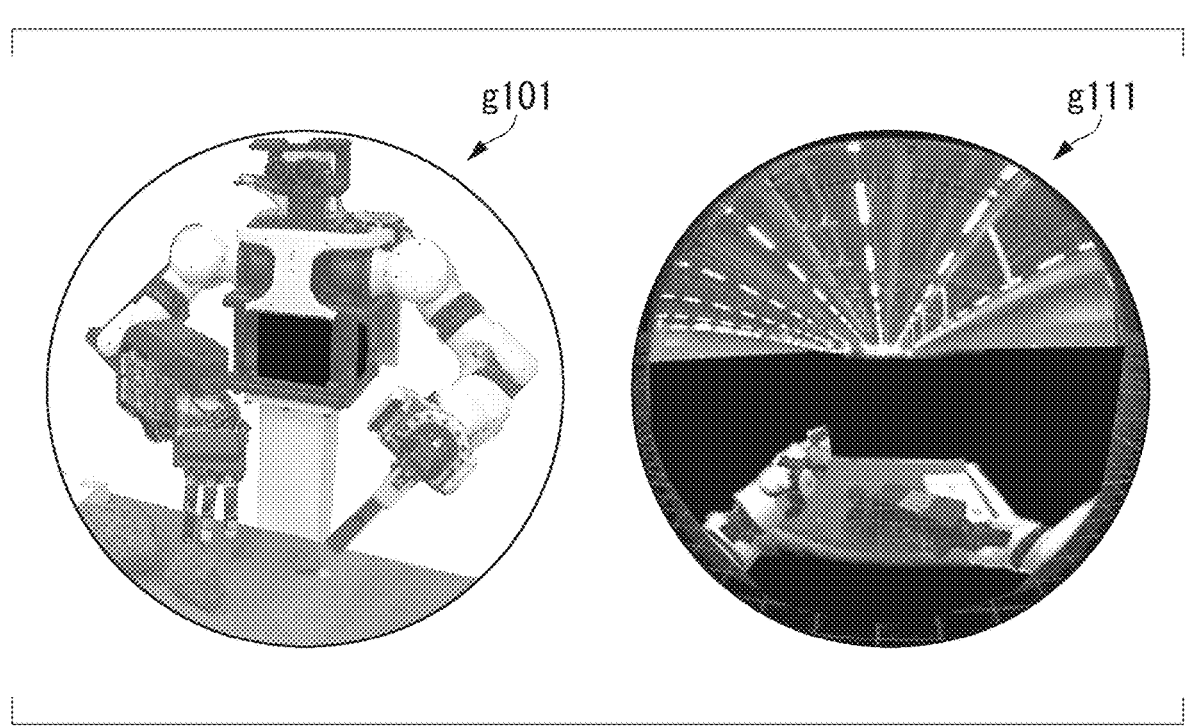
FIG. 12 is a diagram illustrating an example of an image captured by a visual sensor.

FIG. 12 is a diagram illustrating an example of an image captured by the visual sensor. An image g101 is an image indicating an example of an image obtained by causing the first visual sensor 301 to image a work state including the robot 31. An image g111 is an image indicating an example of an image from the first visual sensor 301 when seen from the robot 31. The images g101 and g111 indicate an example of images of one of two visual sensors 301.

A delay occurs in an actual visual image acquired in a remote location by the robot 31. Accordingly, in this embodiment, a virtual viewpoint image is generated using an actual visual image acquired in the past or a mixed image in which an image based on newly received actual visual information is combined with the virtual viewpoint image may be generated and presented to the HMD 201. The virtual viewpoint image is, for example, an image obtained by estimating viewpoints of 360 degrees in a spherical shape.

According to this embodiment, since a virtual viewpoint image is generated, an operator can observe an environment in which the robot 31 is present from a free viewpoint regardless of the viewpoint of the robot 31. In this embodiment, since a current virtual viewpoint image is estimated using actual visual information acquired with a delay, it is possible to continuously provide an image of a work space of the robot 31 to an operator by providing a virtual viewpoint image in a period in which actual visual information is not acquired.

According to this embodiment, it is possible to present a photo-realistic image without a delay to an operator even in a delay environment. According to this embodiment, it is possible to prepare a virtual image of a region which is not visible form the robot.

A space in which the robot 31 is present is not limited to a universal space, and the technique according to this embodiment can be applied to a location which is separated from an operator because a delay occurs in transmission and reception of data.

The HMD 201 may be of a binocular type or a monocular type. A virtual viewpoint image which is presented may be monochromatic or colored. An image which is presented may be continuous still images or a moving image with a short duration time.

By recording a program for realizing all or some functions of the operation-side device 2 and the remote-location device 3 according to the present invention on a computer-readable recording medium and causing a computer system to read and execute the program recorded on the recording medium, all or some processes which are performed by the operation-side device 2 and the remote-location device 3 may be performed. The "computer system" mentioned herein may include an operating system (OS) or hardware such as peripherals. The "computer system" includes a WWW system including a homepage providing environment (or display environment). Examples of the "computer-readable recording medium" include a portable memory such as a flexible disk, a magneto-optical disc, a ROM, or a CD-ROM and a storage device such as a hard disk incorporated into a computer system. The "computer-readable recording medium" may include a medium that holds a program for a predetermined time such as a volatile memory (for example, a RAM) in a computer system serving as a server or a client when the program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit. The program may be a program for realizing some of the aforementioned functions. The program may be a so-called differential file (a differential program) which can realize the aforementioned functions in combination with another program stored in advance in the computer system.

While a mode for implementing the present invention has been described in conjunction with an embodiment, the present invention is not limited to the embodiment, and various modifications and replacements can be added thereto without departing from the gist of the present invention.

What is claimed is:

1. A remote operation method of a robot comprising:

a conversion step of converting an operation input with respect to an operation-side device operated by an operator to a joint angle command value of the robot;

an acquisition step of acquiring actual visual information of a space in which the robot is present;

a generation step of generating virtual visual information of an arbitrary viewpoint in the space in which the robot is present for the operator using a three-dimensional representation;

a projection step of projecting the virtual visual information to a screen viewed by the operator when the actual visual information is not newly acquired and projecting a mixed image in which an image based on the newly acquired actual visual information is combined with the virtual visual information when the actual visual information is newly acquired to the screen viewed by the operator, wherein the virtual visual information, in order to reduce an effect of transmission latencies between the operation-side device and the robot, is calculated through an inverse conversion of the three-dimensional representation for predicting parameters such as a motion and a shape from the visual information by regression with visual information stored in the operation-side device between a first time at which the actual visual information is acquired and a second time at which the actual visual information acquired at the first time arrives at the operation-side device operated by the operator as inputs and is calculated by interpolating the parameters between times using a time-series network; and a step of transmitting the virtual visual information to the robot while reducing transmission latencies between the operation-side device and the robot based on the virtual visual information, and actuating, based on control data included in the virtual visual information, an actuator associated with the robot during remote operation of the robot.

2. The remote operation method of a robot according to claim 1, wherein the generation step includes generating the virtual visual information by inputting the joint angle command value, a posture of the screen viewed by the operator, and the acquired actual visual information to a trained model.

3. The remote operation method of a robot according to claim 1, wherein the virtual visual information is generated using posture information obtained by estimating postures of the robot and an object to be operated at a time at which the actual visual information is acquired.

4. The remote operation method of a robot according to claim 1, wherein the actual visual information includes meta data including time information indicating a time at which an image is captured, position information of an object to be operated recognized through a recognition process performed on the captured image, and posture information of the object to be operated, and wherein the generation step includes generating the virtual visual information using estimation information obtained by estimating the posture of the robot and the posture of the object to be operated using the meta data.

5. The remote operation method of a robot according to claim 1, wherein the actual visual information includes RGB data and depth data.

6. A remote operation method of a robot comprising:

a conversion step of converting an operation input with respect to an operation-side device operated by an operator to a joint angle command value of the robot;

an acquisition step of acquiring actual visual information of a space in which the robot is present;

a generation step of generating virtual visual information of an arbitrary viewpoint in the space in which the robot is present for the operator using a three-dimensional representation;

a projection step of projecting the virtual visual information to a screen viewed by the operator when the actual visual information is not newly acquired and projecting a mixed image in which an image based on the newly acquired actual visual information is combined with the virtual visual information when the actual visual information is newly acquired to the screen viewed by the operator, wherein the projection step, in order to reduce an effect of transmission latencies between the operation-side device and the robot, includes determining a mixture ratio of the actual visual information and the virtual visual information according to a rate of change of the actual visual information with time; and a step of transmitting the virtual visual information to the robot while reducing the transmission latencies between the operation-side device and the robot based on the virtual visual information, and actuating, based on control data included in the virtual visual information, an actuator associated with the robot during remote operation of the robot.

7. A non-transitory computer-readable storage medium storing a program, the program causing a remote operation computer to perform:

converting an operation input with respect to an operation-side device operated by an operator to a joint angle command value of the robot;

acquiring actual visual information of a space in which the robot is present;

generating virtual visual information of an arbitrary viewpoint in the space in which the robot is present for the operator using a three-dimensional representation;

projecting the virtual visual information to a screen viewed by the operator when the actual visual information is not newly acquired and projecting a mixed image in which an image based on the newly acquired actual visual information is combined with the virtual visual information when the actual visual information is newly acquired, wherein the virtual visual information, in order to reduce an effect of transmission latencies between the operation-side device and the robot, is calculated through an inverse conversion of the three-dimensional representation for predicting parameters such as a motion and a shape from the visual information by regression with visual information stored in the operation-side device between a first time at which the actual visual information is acquired and a second time at which the actual visual information acquired at the first time arrives at the operation-side device operated by the operator as inputs and is calculated by interpolating the parameters between times using a time-series network, and transmitting the virtual visual information to the robot while reducing the transmission latencies between the operation-side device and the robot based on the virtual visual information, and actuating, based on control data included in the virtual visual information, an actuator associated with the robot during remote operation of the robot.

8. A remote operation device comprising:

a conversion unit configured to convert an operation input with respect to an operation-side device operated by an operator to a joint angle command value of the robot;

an acquisition unit configured to acquire actual visual information of a space in which the robot is present;

a generation unit configured to generate virtual visual information of an arbitrary viewpoint in the space in which the robot is present for the operator using a three-dimensional representation;

a projection unit configured to project the virtual visual information to a screen viewed by the operator when the actual visual information is not newly acquired and to project a mixed image in which an image based on the newly acquired actual visual information is combined with the virtual visual information when the actual visual information is newly acquired, wherein the virtual visual information, in order to reduce an effect of transmission latencies between the operation-side device and the robot, is calculated through an inverse conversion of the three-dimensional representation for predicting parameters such as a motion and a shape from the visual information by regression with visual information stored in the operation-side device between a first time at which the actual visual information is acquired and a second time at which the actual visual information acquired at the first time arrives at the operation-side device operated by the operator as inputs and is calculated by interpolating the parameters between times using a time-series network, and a communication unit configured to transmit the virtual visual information to the robot while reducing the transmission latencies between the operation-side device and the robot based on the virtual visual information, and actuate, based on control data included in the virtual visual information, an actuator associated with the robot during remote operation of the robot.

9. A remote operation system comprising a remote operation device and a remote-location device, wherein the remote-location device includes:

a robot; and a visual sensor detecting an actual visual image of an environment in which the robot is present, and wherein the remote operation device includes:

a conversion unit configured to convert an operation input with respect to an operation-side device operated by an operator to a joint angle command value of the robot;

an acquisition unit configured to acquire actual visual information of a space in which the robot is present;

a generation unit configured to generate virtual visual information of an arbitrary viewpoint in the space in which the robot is present for the operator using a three-dimensional representation;

a projection unit configured to project the virtual visual information to a screen viewed by the operator when the actual visual information is not newly acquired and to project a mixed image in which an image based on the newly acquired actual visual information is combined with the virtual visual information when the actual visual information is newly acquired, wherein the virtual visual information, in order to reduce an effect of transmission latencies between the operation-side device and the robot, is calculated through an inverse conversion of the three-dimensional representation for predicting parameters such as a motion and a shape from the visual information by regression with visual information stored in the operation-side device between a first time at which the actual visual information is acquired and a second time at which the actual visual information acquired at the first time arrives at the operation-side device operated by the operator as inputs and is calculated by interpolating the parameters between times using a time-series network, and a communication unit configured to transmit the virtual visual information to the robot while reducing the transmission latencies between the operation-side device and the robot based on the virtual visual information, and actuate, based on control data included in the virtual visual information, an actuator associated with the robot during remote operation of the robot.

* * * * *